(No Model.) 2 Sheets—Sheet 2.

W. J. LLOYD & W. PRIEST.
BICYCLE.

No. 426,191. Patented Apr. 22, 1890.

Witnesses:
T. W. Johnson.
L. M. Bartlett.

Inventors
Walter John Lloyd
William Priest
By Attorney:
W. A. Bartlett

UNITED STATES PATENT OFFICE.

WALTER JOHN LLOYD AND WILLIAM PRIEST, OF BIRMINGHAM, COUNTY OF WARWICK, ENGLAND.

BICYCLE.

SPECIFICATION forming part of Letters Patent No. 426,191, dated April 22, 1890.

Application filed December 26, 1889. Serial No. 334,939. (No model.) Patented in England September 8, 1888, No. 13,017.

*To all whom it may concern:*

Be it known that we, WALTER JOHN LLOYD and WILLIAM PRIEST, residing at Sheepcote Street, Birmingham, in the county of Warwick, England, Great Britain, have invented certain new and useful Improvements in Bicycles and Tricycles, (which was patented in England September 8, 1888, No. 13,017,) of which the following is a specification, reference being had therein to the accompanying drawings.

This invention relates to the construction of bicycles and tricycles.

The object of the invention is to produce a bicycle having a strong frame which may be readily taken apart or uncoupled for shipment, storage, or repair.

Figure 1:
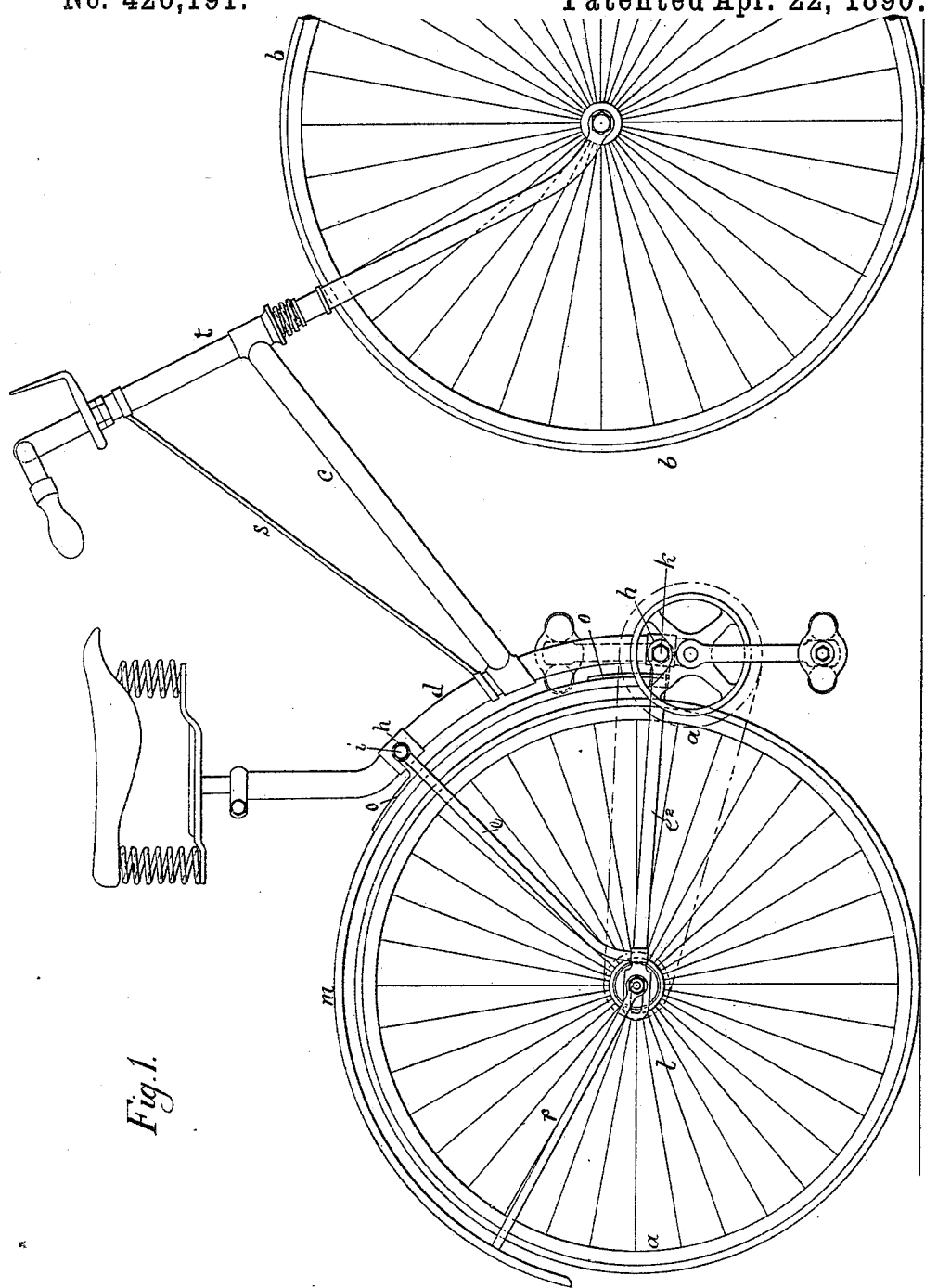
Figure 2:
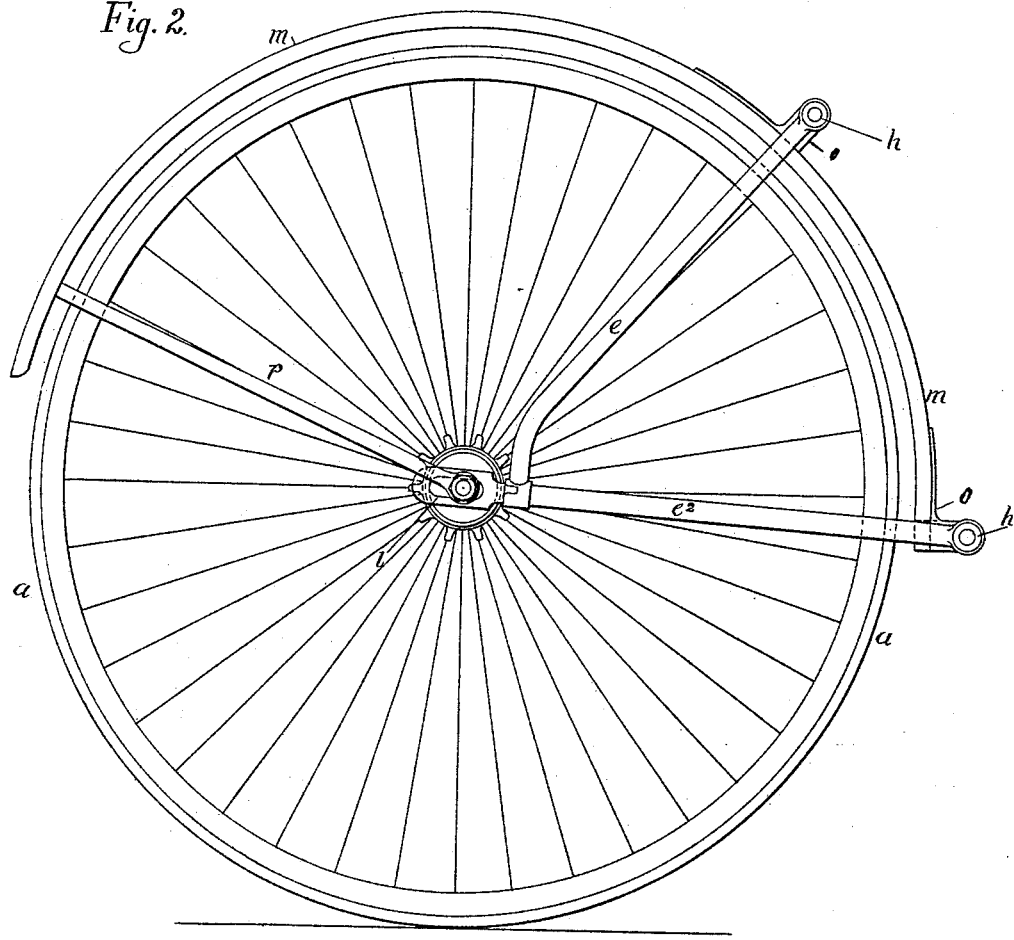
Figure 3:
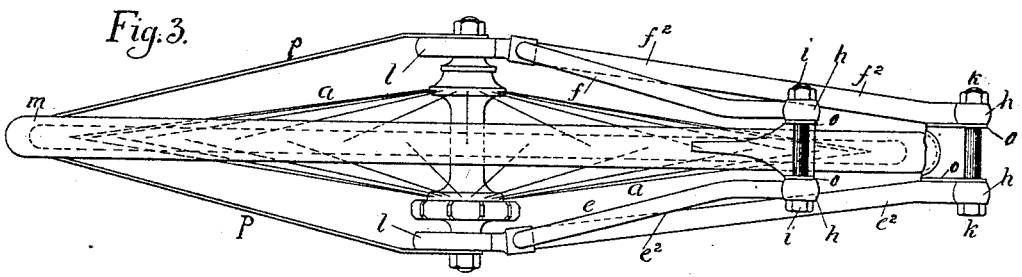

Figure 1 is a side elevation of the improved bicycle, part of the front wheel being broken away and some parts of the machine omitted. Fig. 2 is a side elevation of the rear wheel and frame detached. Fig. 3 is a plan of Fig. 2.

The reference-letter $a$ denotes the rear driving-wheel of a bicycle, say, of the well-known "safety" pattern. $b$ is the front or steering wheel. $c$ is the backbone, which, instead of being forked, as generally made, is shortened in the rear and attached to the seat-post $d$. Seat-post $d$ is curved at its lower end and supports the seat or saddle, as usual. A V-shaped frame-work at each side of the rear wheel has its closed end slotted to receive the axle of the rear wheel.

$e$ indicates the top inclined bar, and $e^2$ the lower horizontal bar, of the V-shaped frame at one side of the machine, and $f$ $f^2$ the corresponding bars at the other side. The front ends of bars $e^2 f^2$ have eyes $h$ $h$, and in coupling the machine a bolt $k$ is passed through these eyes and through a hole or slot near the bottom of the seat-post. The upper bars $e$ $f$ of the V-shaped frames have similar eyes $h$ at their forward ends, and are tied to the seat-post $d$ by bolt $i$, passing through these eyes and the seat-post. The seat-post $d$ thus forms one side of a triangular frame, which frame is divided in rear of said post, one half being formed of bars $e$ $e^2$ and the other half of bars $f$ $f^2$. The rear end of said frame is wider than the front, and the axle of the rear wheel rests in the slots $l$ near the rear angle of said triangular frame.

The mud-guard $m$ is connected to the bolts $h$ and $i$ by brackets $o$, attached to said guard, the brackets being perforated for the passage of said bolts and secured to the guard in any usual manner. The rear end of the mud-guard is supported by braces $p$ $p$, which are connected to the guard, and have eyes or loops around the axle of the rear wheel.

The seat-post $d$ is braced from the front fork $t$ by the brace or tie rod $s$.

The triangular cage formed by the bars, rods, or braces $e$ $e^2$ $f$ $f^2$ and the seat-post is very strong and rigid.

By removing the bolts $i$ and $k$ the frame may be uncoupled, and the rear or driving wheel and its V-shaped frames will thus be separated from the front part of the machine. The front fork, backbone, and seat-bar will be left attached to the front wheel. The driving-gear is shown connected to the seat-post, but may be connected to bolt $h$, as is readily apparent.

The divided V-shaped frame may be readily adapted for connection to any of the wheels of a bicycle or tricycle in lieu of the common single fork.

What is claimed herein is—

1. In a bicycle, a V-shaped frame-work at each side of the rear wheel, having bearings for the axle, the mud-guard connected to the front of said frames, and means for connecting the front of the V-shaped frames with the seat-post, substantially as described.

2. In a bicycle, the combination, with the rear axle, of a V-shaped frame at each end thereof and having a bearing for said axle, a mud-guard having brackets thereon which are perforated in line with perforations in the front of the V-shaped frames, the seat-post having corresponding perforations, and bolts connecting the frames and mud-guard to the seat-post, substantially as described.

In testimony whereof we affix our signatures in presence of two witnesses.

WALTER JOHN LLOYD.
    WILLIAM PRIEST.

Witnesses:
 CHARLES EDWARD HILL,
 FREDERICK HENRY CORNISH.